United States Patent
Swartz et al.

(10) Patent No.: US 11,575,413 B1
(45) Date of Patent: Feb. 7, 2023

(54) PHYSICAL LAYER SHIELDING OF WIRELESS COMMUNICATIONS

(71) Applicant: Cisco Technology, Inc., San Jose, CA (US)

(72) Inventors: John Matthew Swartz, Lithia, FL (US); Nagendra Kumar Nainar, Morrisville, NC (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/582,689

(22) Filed: Jan. 24, 2022

(51) Int. Cl.
*H04B 7/0452* (2017.01)
*H04B 7/0426* (2017.01)
*H04B 17/336* (2015.01)
*H04B 17/327* (2015.01)

(52) U.S. Cl.
CPC ......... *H04B 7/0452* (2013.01); *H04B 7/0426* (2013.01); *H04B 17/327* (2015.01); *H04B 17/336* (2015.01)

(58) Field of Classification Search
CPC .. H04B 7/0452; H04B 7/0426; H04B 17/327; H04B 17/336
See application file for complete search history.

(56) References Cited

U.S. PATENT DOCUMENTS

| | | | | |
|---|---|---|---|---|
| 2014/0036850 | A1* | 2/2014 | Akimoto | H04J 13/004 370/329 |
| 2015/0381221 | A1* | 12/2015 | Cyzs | H04B 1/7097 375/346 |
| 2016/0127937 | A1 | 5/2016 | Schelstraete et al. | |
| 2016/0345278 | A1 | 11/2016 | Chu et al. | |
| 2018/0338241 | A1* | 11/2018 | Li | H04W 4/40 |
| 2020/0343953 | A1 | 10/2020 | Sridharan et al. | |
| 2021/0045134 | A1 | 2/2021 | Zhou et al. | |

FOREIGN PATENT DOCUMENTS

CN 112350762 A 2/2021
WO 2020/254031 A1 12/2020

OTHER PUBLICATIONS

Wu et al., "Towards Smart and Reconfigurable Environment: Intelligent Reflecting Surface Aided Wireless Network," IEEE Communications Magazine, vol. 58, Issue: 1, Jan. 2020, 8 pages.
(Continued)

*Primary Examiner* — Vineeta S Panwalkar
(74) *Attorney, Agent, or Firm* — Edell, Shapiro & Finnan, LLC

(57) ABSTRACT

Presented herein are techniques to shield transmissions from being received and the information contained in them recovered by unwanted devices. Multi-user multiple-input multiple-output (MU-MIMO) techniques are employed, and in particular the spatial dimension aspects of those techniques. Shield nodes are controlled to transmit in a way to obscure the downlink streams transmitted by a wireless access point that are intended for a particular client device to anything outside of the shielded area, and also to obscure uplink streams from one or more client devices to the wireless access point to anything outside of the shielded area but allowing the uplink streams to be well received by the wireless access point.

20 Claims, 8 Drawing Sheets

(56) References Cited

OTHER PUBLICATIONS

Lu et al., "Intelligent Reflecting Surface Enabled Covert Communications in Wireless Networks," IEEE Network, vol. 34, Issue: 5, Sep./Oct. 2020, 15 pages.

Cisco, "Cisco Aironet 1800s Active Sensor Getting Started Guide," https://www.cisco.com/c/en/us/td/docs/wireless/access_point/1800/quick/guide/ap1800sgetstart.html, Aug. 2021, 54 pages.

Cisco, "Cisco Aironet Active Sensor Data Sheet," https://www.cisco.com/c/en/us/products/collateral/wireless/aironet-active-sensor/nb-09-air-act-sen-data-sheet-cte-en.html, Sep. 2021, 13 pages.

Cisco, "Cisco 1800S Sensor Deployment Guide," Cisco DNA Center Release 1.3.3, https://www.cisco.com/c/dam/en/us/td/docs/cloud-systems-management/network-automation-and-management/dna-center/deploy-guide/Cisco_1800S_Sensor_Deployment_Guide_133.pdf, Nov. 2020, 53 pages.

Deng, et al., "IEEE 802.11 be Wi-Fi 7: New Challenges and Opportunities," IEEE Communications Surveys & Tutorials, vol. 22, Issue: 4, Jul. 2020, 30 pages.

Yang et al., "Overview of Multi-AP Operation in 11be," doc.: IEEE 802.11-20/0064r1, https://mentor.ieee.org/802.11/dcn/20/11-20-0064-01-00be-overview-of-multi-ap-operation-in-11be.pptx, Jan. 2020, 13 pages.

Adame, et al., "Time-Sensitive Networking in IEEE 802.11be: On the Way to Low-Latency WiFi 7," Sensors 2021, https://doi.org/10.3390/s21154954, Jul. 2021, 20 pages.

Raja, et al., "Multiuser MIMO Transceiver Design for Uplink and Downlink with Imperfect CSI," Wireless Personal Communications, An International Journal, Sep. 2013, 22 pages.

Zarei, et al., "Uplink/Downlink Duality in Multi-Cell MU-MIMO Systems with Hardware Impairments," WSA 2016, Mar. 2016, 7 pages.

Lopez-Perez et al., "IEEE 802.11be Extremely High Throughput: The Next Generation of Wi-Fi Technology Beyond 802.11ax," IEEE Communications Magazine, vol. 57, Issue: 9, Sep. 2019, 6 pages.

Cisco, "IEEE 802.11ax: The Sixth Generation of Wi-Fi," Technical white paper, https://www.cisco.com/c/en/us/products/collateral/wireless/white-paper-c11-740788.html, Apr. 2020, 16 pages.

Anand, et al., "STROBE: Actively Securing Wireless Communications using Zero-Forcing Beamforming," 2012 Proceedings IEEE INFOCOM, Mar. 2012, 9 pages.

\* cited by examiner

PHYSICAL LAYER SHIELDING OF WIRELESS COMMUNICATIONS

TECHNICAL FIELD

The present disclosure relates to wireless networking.

BACKGROUND

Due to the nature of wireless signal propagation, it is very common to see multiple Wi-Fi® networks overlapping. There are privacy and security concerns. Hackers and rogue users are always looking for opportunity to obtain confidential data carried by wireless transmissions. The challenge is to control the wireless signal to avoid security breach and leaks, while maintaining proper operation of the wireless networks.

DESCRIPTION OF EXAMPLE EMBODIMENTS

Overview

Figure 1A:
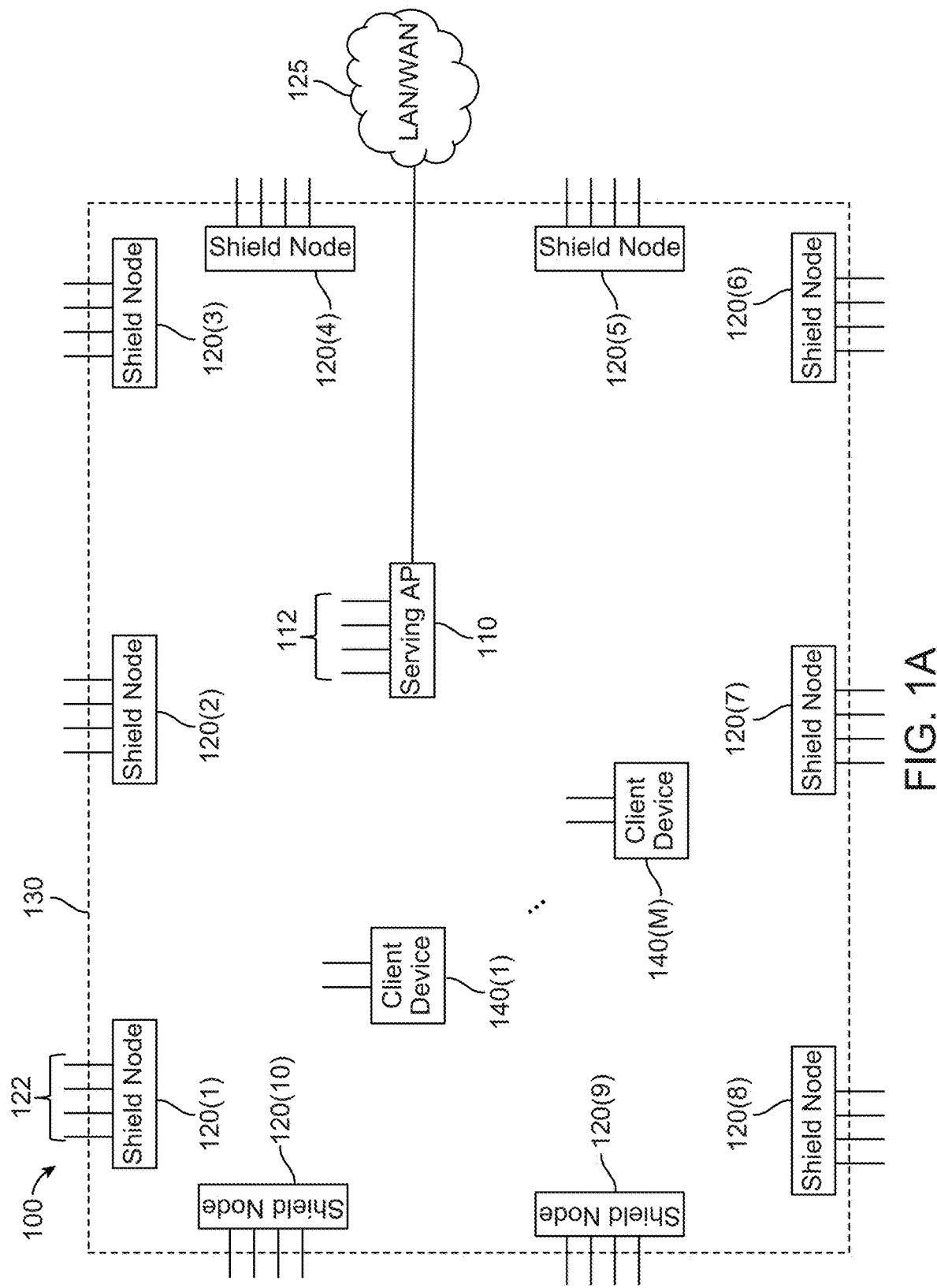
FIG. 1A is a block diagram of a system configured to protect from undesired reception of transmissions to and from a wireless client device in a physical space, according to an example embodiment.

Briefly, multi-user multiple-input multiple-output (MU-MIMO) techniques are employed, and in particular the spatial dimension aspects of those techniques. Shield nodes are controlled to transmit in a way to obscure the downlink streams transmitted by a wireless access point that are intended for a particular client device to anything outside of the shielded area, and also to obscure uplink streams from one or more client devices to the wireless access point to anything outside of the shielded area but allowing the uplink streams to be well received by the wireless access point.

In one form, a method is provided that is performed by a serving wireless access point capable of wireless communication with one or more wireless client devices within a physical space within which a plurality of shield wireless transceiver devices are positioned around a perimeter of, or in an arrangement within, the physical space. Each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices. The method includes, for a downlink transmission to be sent from the serving wireless access point to a first wireless client device of the one or more wireless client devices: sending a multi-user multiple-input multiple-output (MU-MIMO) transmission that includes a stream containing downlink traffic intended for the first wireless client device; and causing one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device. The method also includes, for an uplink transmission to be sent from the first wireless client device of the one or more wireless client devices to the serving wireless access point: transmitting a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

Example Embodiments

Presented herein are techniques to shield transmissions from being received and the information contained in them recovered by unwanted devices. This may be desirable when one or more client devices are connected to a wireless network that is operating in a physical space in which over-the-air transmissions could be received outside the physical space, or outside of a particular sub-region of the physical space. Such a situation is more prevalent as more people work from home and use wireless networks in their apartment or house. However, this situation may also occur in enterprise/business offices environments where it may be desirable to prevent unauthorized reception of wireless transmissions outside of a conference room, factory floor or other workspace.

Figure 1B:
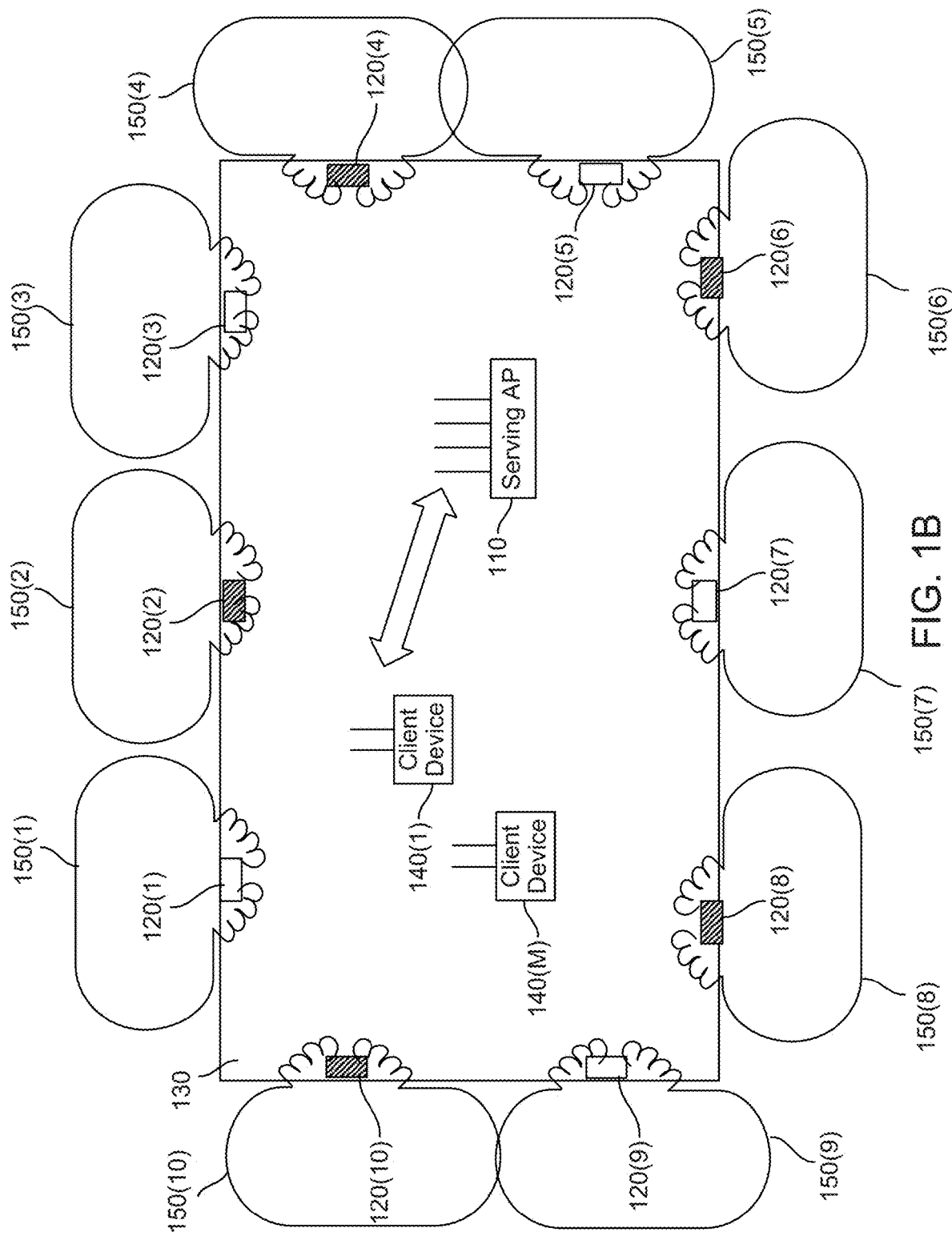
FIG. 1B is a diagram showing deployment of the system depicted in FIG. 1A in a physical space, according to an example embodiment.

Reference is now made to FIGS. 1A and 1B. These figures illustrate a system 100 that can provide an active radio frequency (RF) wireless shield outside of a physical space to be protected. The system 100 includes a data serving wireless access point (AP) 110 and a plurality of coordinated wireless nodes, called shield nodes. In the example arrangement shown in FIGS. 1A and 1B, there are 10 shield nodes 120(1)-120(10) positioned around a perimeter of a physical space 130 to be protected. This is meant to be a non-limiting example as the number of shield nodes and their positions may vary depending on the size and shape of the physical space. The shield nodes may have semi-directional antennas pointing outward so that their transmissions are the strongest in the direction of areas where is desired to prevent snooping.

The serving AP 110 has connectivity to a local area network/wide-area network (LAN/WAN) 125, through any suitable gateway, broadband Internet Service Provider (ISP) modem, etc. (not shown in FIGS. 1A and 1B, for simplicity).

There are one or more client devices 140(1)-140(M) shown inside the physical space 130. The downlink transmissions from the serving AP 110 to the client devices 140(1)-140(M) and the uplink transmissions from the client devices 140(1)-140(M) to the serving AP 110 are to be protected by creating the active RF wireless shield outside the physical space using the shield nodes 120(1)-120(10). The client devices 140(1)-140(M) may be laptop computers with wireless network connectivity, Smartphones, desktop computers with wireless network connectivity, video conference endpoints, or any suitable end user device that may receive downlink traffic from the serving AP and send uplink traffic to the serving AP.

The serving AP 110 includes a plurality of antennas 112 that are used for steering of transmissions, as described further below. The shield nodes 120(1)-120(10) may include one or a plurality of antennas 122, but noteworthy is that the one or more antennas 122 of the shield nodes are directional antennas that are configured to have a transmit beam pattern outward from the physical space 130. This is best shown in FIG. 1B, where the transmit beam pattern 150(1)-150(10) is shown for the respective shield nodes 120(1)-120(10). The shapes and dimensions of the transmit beam patterns 150(1)-150(10) are only examples and not meant to be limiting. Again, the shield nodes 120(1)-120(1) are wireless transceiver devices configured to be positioned around a perimeter of, or in an arrangement within, the physical space 130, wherein each of the shield wireless transceiver devices includes one or more directional antennas 122 pointing outward from the physical space 130 so that transmissions from respective shield nodes are strongest in a predetermined area within the physical space or outside of the physical space 130 where shielding is to be achieved for transmissions between the serving AP 110 and the one or more wireless client devices 140(1)-140(M).

The serving AP 110 coordinates operation of the shield nodes 120(1)-120(10) to create an active wireless shield coincident in time with uplink and downlink transmissions between the serving AP 110 and one or more client devices 140(1)-140(M). The goal is that the intended recipient of a downlink transmission (e.g., one or more of the client devices 140(1)-140(M) or of an uplink transmission (the serving AP 110) will be able to receive and decode the transmission, but any device outside of the physical space 130 will not be able to decode the transmission because the signal-to-interference ratio of those transmissions outside the physical space will be too poor.

In one embodiment, multi-user multiple-input multiple-output (MU-MIMO) techniques of the IEEE 802.11ax standard are employed, and in particular the spatial dimension aspects of those techniques. The shield nodes transmit in a way to obscure the downlink streams that are designated for a particular client device to anything outside of the shielded area, and also to obscure uplink streams from one or more client devices inside the shielded area to anything outside of the shielded area but allowing the uplink streams to be well received by the serving AP 110.

The assumption is that a snooping device is going to be outside the perimeter of the physical space 130. Thus, the transmit beam patterns from the shielding nodes are directed outward of the perimeter of the physical space 130 where the shielding transmissions are the strongest as indicated in FIG. 1B, and inside the shielded space there will be some interference from the shielding transmissions, but it will be much lower (e.g., 20 dB lower). Moreover, the shielding transmissions sent by the shield nodes 120(1)-120(10) may be steered in such a way that they are nulled at the serving AP 110 (in the case of a shielded uplink transmission) or at the client device (in the case of a shielded downlink transmission) so the serving AP 110 and client device experience as little interference as possible from the shielding transmissions. The shielded device (one or more of the client devices 140(1)-140(M) or the serving AP 110) is ignorant to what is going on with the shielding transmissions.

The shield nodes 120(1)-120(10) can be a part of the network infrastructure such as 802.11 stations (STAs) that are capable of acting as both an AP and a client), or off-the-shelf clients, or a mix. Again, the purpose of the shield nodes is to provide cover for uplink and downlink physical layer protocol data units (PPDUs) by transmitting over top of them while the serving AP 110 and the client device exchange protected data.

The shield nodes may be arranged/configured to operate as "uplink shields," as "downlink shields" or as both. Uplink shield nodes act as client-type devices during coordinated MU-MIMO uplink events and are triggered by the serving AP 110. Downlink shield nodes act as AP-type devices and transmit during downlink transmission events. A given shield node could be configured to serve as an uplink shield and a downlink shield, if it has two radios (one in STA mode and another in AP mode) or a single radio running software that can support both acting as a client and AP in downlink and uplink. In any case, the shield nodes may be wall-powered or battery powered, and may (or may not be) associated to the serving AP 110 and have established some configuration with the serving AP so that they are able to coordinate with the traffic exchanges to transmit at the same time as an uplink transmission or a downlink transmission in order to provide active RF shielding.

As shown in FIGS. 1A and 1B, the shield nodes have semi-directional antennas 122 that are focused outward. The shield nodes could further have multiple antennas that allow for the use of beam steering techniques to null any of the shielding transmissions at the client device or at the serving AP to be sure there is minimal or no negative impact at these intended devices.

In one example of a deployment, shield nodes may be arranged such that uplink shield nodes are interleaved with downlink shield nodes. For example, shield nodes 120(1), 120(3), 120(5), 120(7) and 120(9) are uplink shield nodes, and shield nodes 120(2), 120(4), 120(6), 120(8) and 120(1) are downlink shield nodes. This is only an example, however.

Figure 2:
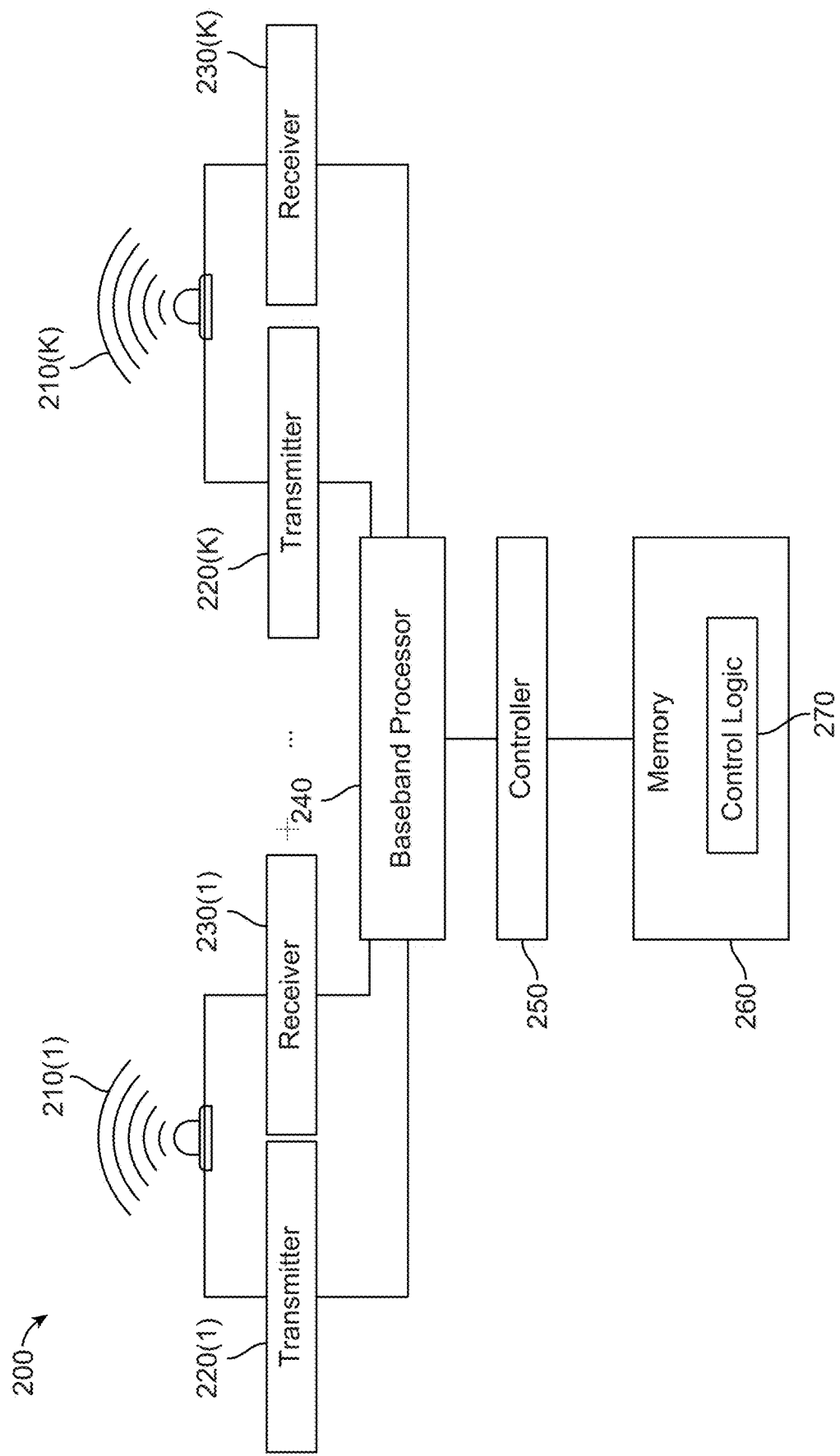
FIG. 2 is a block diagram of a shield node that forms part of the system depicted in FIGS. 1A and 1B, according to an example embodiment.

Reference is now made to FIG. 2, which shows a block diagram of a shield node 200 (representative of any of the shield nodes shown in FIGS. 1A and 1B), according to an example embodiment. The shield node 200 includes one or more semi-directionally antennas 210(1)-210(K). The shield node could be MIMO devices so that they can participate in MU-MIMO. To this end, there a transmitter 220(1) and a receiver 230(1) associated with antenna 210(1) and a transmitter and a receiver 220(K) and a receiver 230(K) associated with antenna 210(K). A baseband processor (modem) 240 is connected to the transmitters 220(1)-220(K) and to the receiver 230(1)-230(K). There may be multiple baseband processors in a shield node if the shield node is to serve as a shield node in both STA mode and AP mode. The baseband processor 240 is configured to perform the baseband modulation signal processing and baseband demodulation signal processing. The baseband processor 240 may be configured to perform MU-MIMO uplink and downlink signal processing.

A controller 250 is provided to performing overall control of the shield node, based on software instructions stored in memory 260 for control logic 270. The controller 250 may be a microcontroller, a microprocessor or a digital signal processor.

Figure 3:
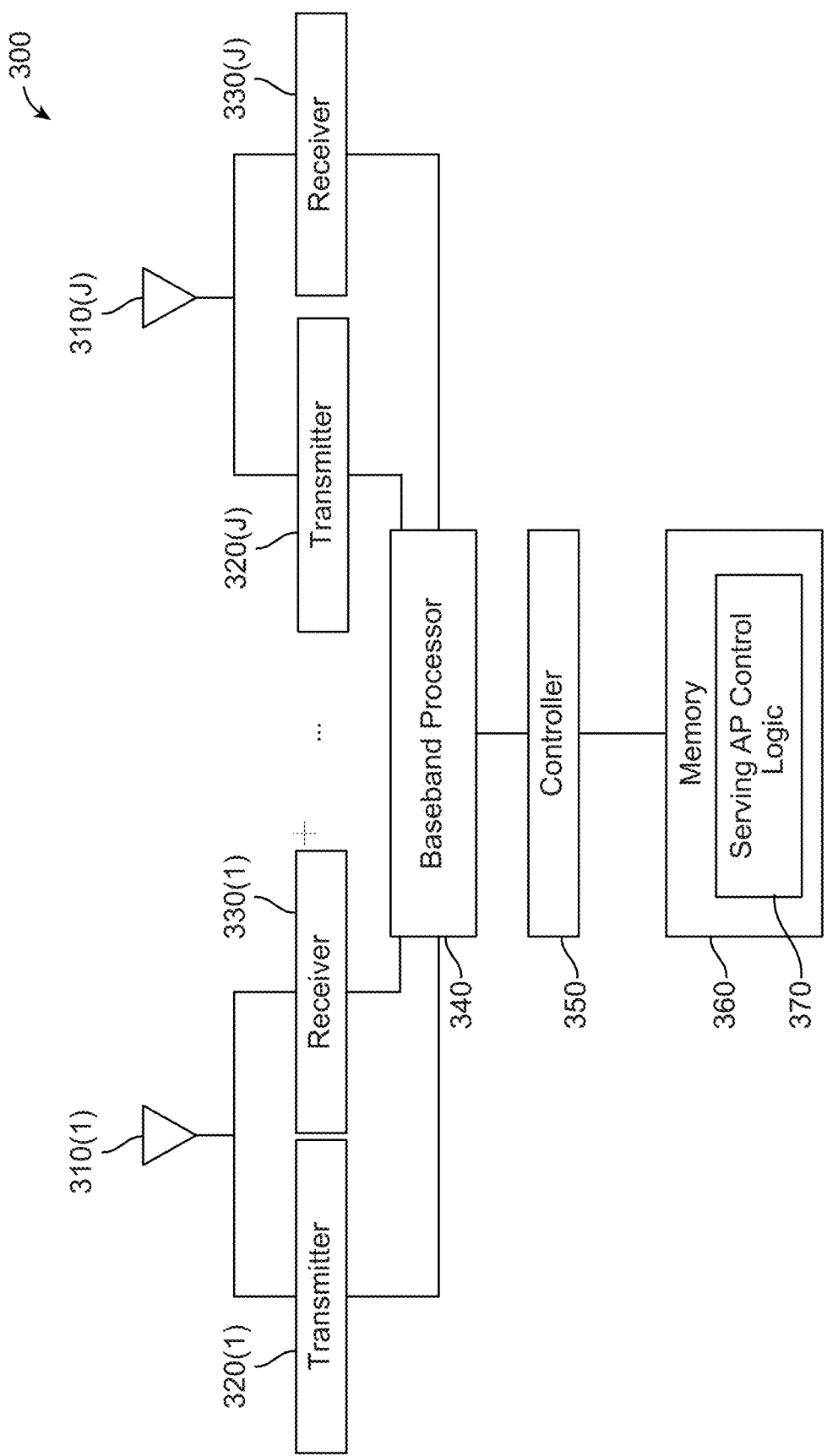
FIG. 3 is a block diagram of a wireless access point device configured to coordinate transmissions to and from a wireless client device in such a way that shield nodes provide transmission cover to prevent reception of the transmissions to and from the wireless client device.

Turning now to FIG. 3, a block diagram is shown of a serving AP 300. The serving AP is fully MU-MIMO capable (pursuant to IEEE 802.11ax) may also configured to coordinate transmissions according to the techniques for IEEE 802.11be. To this end, the serving AP 300 includes a plurality of antennas 310(1)-310(J). There is a transmitter 320(1) and a receiver 330(1) associated with antenna 310(1) and a transmitter and a receiver 320(J) and a receiver 330(J) associated with antenna 310(J). A baseband processor (modem) 340 is connected to the transmitters 320(1)-320(J) and to the receivers 320(1)-320(J). The baseband processor 340 is configured to perform the baseband modulation signal processing and baseband demodulation signal processing. The baseband processor 340 is configured to perform MU-MIMO uplink and downlink signal processing.

A controller 350 is coupled to the baseband processor 340 and performs higher level control functions of the serving AP 300. The controller 350 may be a microprocessor, microcontroller or digital signal processor. A memory 360 stores instructions for serving AP control logic 370 that the controller 350 executes to perform the control functions of the serving AP.

The serving AP 300 coordinates all downlink and uplink events. The serving AP 300 also provides the shielding transmissions to the shield nodes. The serving AP 300 also runs a power calibration process, described below. These functions of the serving AP 300 are performed under control and execution by the controller 350 of the serving AP control logic 370, and in coordination with operations performed by the baseband processor 340.

Figure 4:
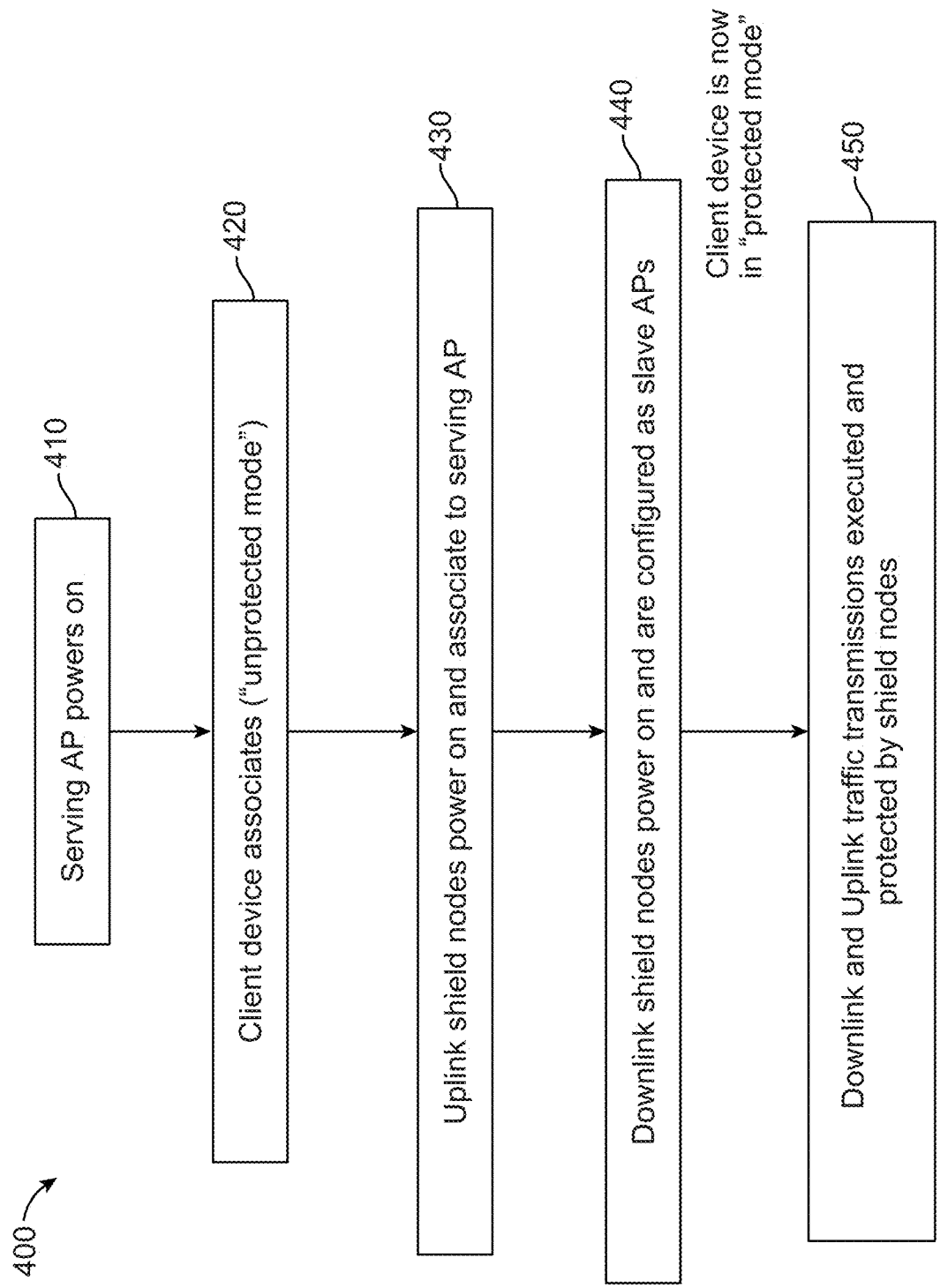
FIG. 4 is a flow chart depicting set up of shield nodes for coordination by a wireless access point device to protect transmissions to and from a wireless client device, according to an example embodiment.

FIG. 4 illustrates a flow chart depicting a process 400 by which the various entities in a wireless network interact to initialize operations to protect transmissions to/from a wireless client device. Reference may also be made to FIGS. 1A and 1B for purposes of the description of FIG. 4.

At 410, the serving AP powers on. At 420, a client device associates to the serving AP. At this point, the client device is associated in a so-called "unprotected mode" insofar as the shield nodes have not yet been powered up and configured. At 430, the shield nodes that serve as uplink shield nodes power and associate to the serving AP. At 440, the shield nodes that serve as downlink shield nodes power on and are configured as slave APs to the serving AP. This may be achieved according to the procedures of IEEE 802.11be. At 450, downlink and uplink traffic transmissions are executed and protected by the shield nodes.

Details are presented below for how coordination is achieved among the shield nodes to provide cover for downlink transmissions and for uplink transmissions.

Downlink Shielding

When a downlink transmission is to be sent, the serving AP does a MU-MIMO transmission to the target wireless client device (for the downlink data traffic intended for the target wireless device) and to some other destinations, such as to uplink shield nodes, but the stream(s) of this MU-MIMO transmission that are not destined to the target wireless client device are just for convenience to complete the MU-MIMO transmission; they do not carry any real information or data. However, the data streams in the MU-MIMO transmission to the uplink shield devices are just random streams meant and may provide some amount of PHY-layer cover (additional to that provided by the DL shield nodes, as described below) so that a snooping device cannot decode the downlink data traffic intended for the target wireless client. The serving AP may perform beam steering of its transmission so that the target wireless client device is the only device to which the MU-MIMO transmission is steered to properly. The streams that are sent to the UL shield nodes may be sent at a higher transmit power level than that which is sent to the target client device, again, to provide some additional PHY-layer cover.

These transmissions may be coordinated according to the procedures of IEEE 802.11be coordinated transmit operations. The serving AP acts as a master AP and the downlink shield nodes act as slave APs, and send random "canned" or bogus data to non-existent clients directed outside the physical space by the semi-directional antennas of the downlink shield nodes, as shown in FIG. 1B. During the same transmit opportunity (Tx Op), the downlink shield nodes can also transmit and null their interfering/cover transmissions to the target wireless client device in order to avoid or minimize interfering with the target wireless client device's reception of the downlink transmission from the serving AP.

More specifically, in one embodiment, in coordinating the timing of downlink shield node transmissions, one of the downlink shield nodes may be designated to operation in AP mode. That designated shield node, called AP_downlink_shield or AP_ds, and the serving AP use spatial reuse techniques. The AP_ds waits for the serving AP to send an AP trigger frame. This causes the AP_ds to send its own AP trigger frame to the downlink shield nodes. The AP_ds keeps track of any Clear-to-Send to Self (CTS2self) or any other indicator of Network Allocation Vector/Transmit Opportunity (NAV/TxOP) timing and uses that for controlling the TxOp of the downlink shields.

In another embodiment, IEEE 802.11be is proposing a more coordinated/cooperative AP mechanism that employs TxOp coordination. In this case, downlink shield nodes would coordinate their transmissions with the downlink TxOps of the serving AP. A MAC-layer mechanism may be employed for the serving AP to coordinate TxOp sharing with other APs.

While the foregoing describes the shielded area being outside a physical space, there may be some applications/situations where it is desired to do some shielding interference inside the physical space, but away from the target/intended recipients within that physical space. A subset of the shield nodes could have their semi-directional antennas adjusted to achieve a beam pattern to cover some portion of the internal space where shielding is desired. This may be the case when there are one or more "guest" user devices in the physical space, and it is desired to prevent those devices from being able to decode transmissions between a client device and AP elsewhere in the physical space.

Uplink Shielding

A conventional MU-MIMO UL trigger may be used to solicit an uplink transmission from a wireless client device and all the UL shield nodes and timing should work out properly. UL shield nodes would be associated to the AP and they would establish themselves as UL shield nodes for the purposes of UL PHY cover. The UL shield nodes are later included in MU UL triggered PPDUs per the procedures of IEEE 802.11ax UL MU-MIMO.

The serving AP sends an UL trigger frame for an MU-MIMO uplink. The uplink shield nodes and the wireless client device transmit on top of each other. The uplink shield nodes can transmit at a higher transmit power since their beams are pointing outward/away from the physical space (and thus away from the serving AP that is the intended recipient). The wireless client device generally transmits an omni-directional beam and can transmit at a lower transmit power. Again, the transmissions from the uplink shield devices provide PHY layer cover for the wireless client device's uplink transmission so that devices outside the physical space are unable to receive and decode the uplink transmission from the wireless client device.

Figure 5:
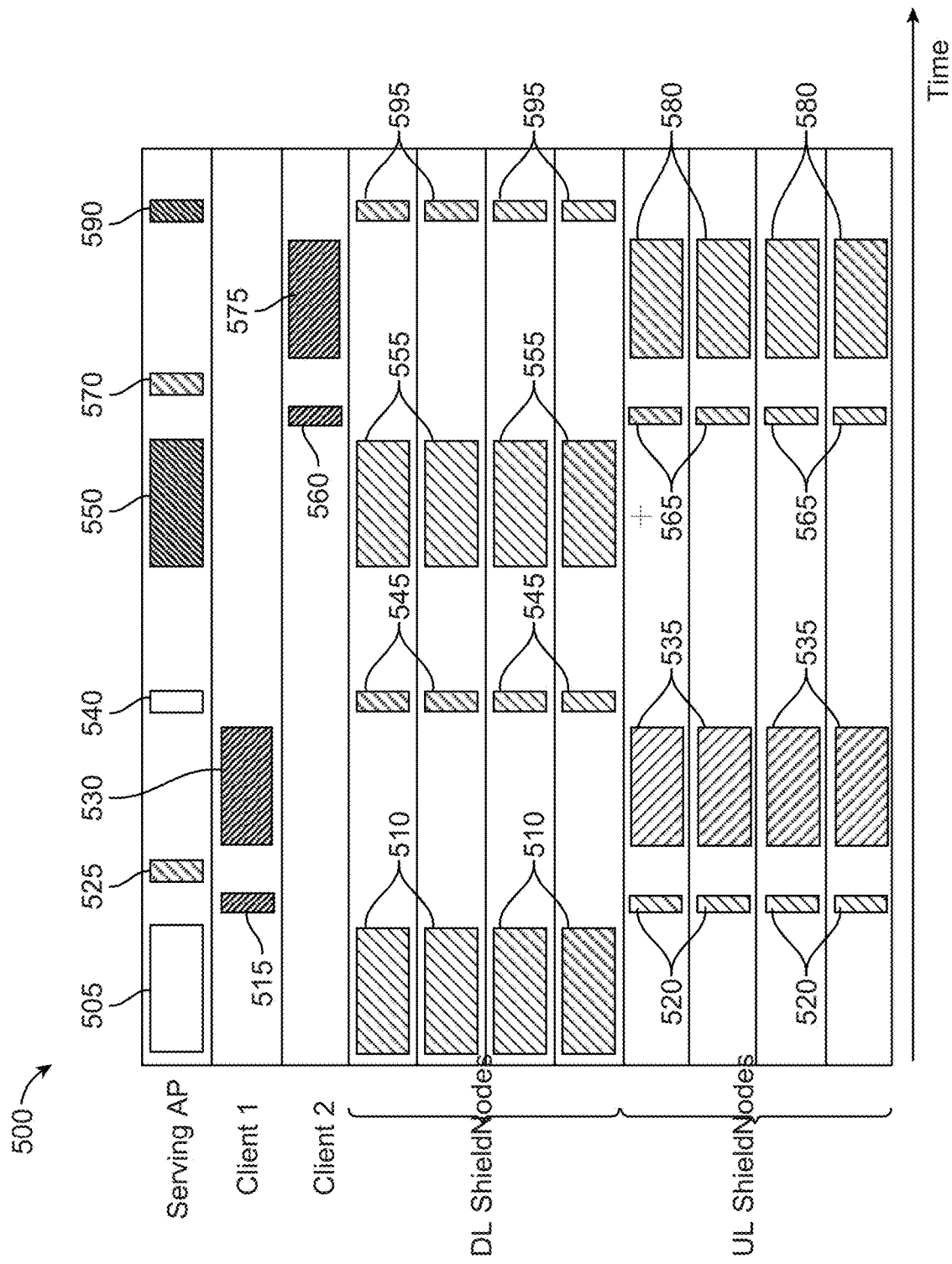
FIG. 5 is a diagram illustrating in more detail coordination of transmissions made by shield nodes to provide cover to transmissions made to and from a wireless client device, according to an example embodiment.

Reference is now made to FIG. 5 for a more detailed description of an example transmission sequence 500 made in a network environment. In the example of FIG. 5, there is a serving AP, two client devices (Client 1 and Client 2), a plurality of downlink (DL) shield nodes (e.g., four DL shield nodes) and a plurality of UL shield nodes (e.g., four UL shield nodes). Moving from left to right, the serving AP sends a MU-MIMO downlink transmission that includes downlink traffic 505 to Client 1, as well as MU traffic to, for example, UL shield nodes, though that is not required. At the same time, the serving AP coordinates the DL shield nodes to transmit, at 510, for PHY-layer cover over the downlink transmission to Client 1. At 515, Client 1 sends an uplink block acknowledgement (ACK) to the serving AP. To shield this uplink transmission, at 520, the UL shield nodes also are coordinated to transmit at the same time that the uplink block ACK is transmitted by Client 1.

At 525, the serving AP transmits an uplink trigger frame. The uplink trigger frame is received by devices in the network, and in this example, Client 1 has data queued up to send. At 530, Client 1 and at 535, UL shield nodes perform a MU-MIMO uplink transmission. The UL shield nodes transmit on top of the uplink transmission 530 to provide PHY layer cover for the Client 1 uplink transmission outside the physical space. As explained above, the UL shield nodes can transmit at a higher transmit power since their beams are pointing outward/away from the physical space (and thus away from the serving AP that is the intended recipient). No nulling/steering of the transmissions made by the UL shield nodes is needed. Client 1 generally transmits an omni-directional beam and can transmit at a lower transmit power.

At 540, the serving AP transmits a downlink block ACK steered to Client 1 to acknowledge reception of the uplink transmission at 530 from Client 1. The serving AP coordinates with the DL shield nodes to cause them to send transmissions, at 545, to achieve cover for the serving AP's ACK transmitted to Client 1, similar to how the serving AP transmits the downlink transmission at 505 to Client 1.

Next, at 550, the serving AP transmits a MU-MIMO downlink transmission that includes downlink traffic 550 to Client 2, as well as MU traffic to, for example, UL shield nodes, though, again, that is not required. At the same time, the serving AP coordinates the DL shield nodes to transmit, at 555, for PHY-layer cover over the downlink transmission to Client 2. At 560, Client 2 sends an uplink block ACK to the serving AP. To shield this uplink transmission from Client 2, at 565, the UL shield nodes also are coordinated to transmit at the same time that the uplink block ACK is transmitted by Client 1.

At 570, the serving AP again transmits an uplink trigger frame. The uplink trigger frame is received by devices in the network, and in this example, Client 2 has data queued up to send. At 575, Client 2 and at 580, UL shield nodes perform a MU-MIMO uplink transmission. The UL shield nodes transmit on top of the uplink transmission 575 to provide PHY layer cover for the Client 2 uplink transmission outside the physical space. No nulling/steering of the transmissions made by the UL shield nodes is needed. Client 2 can transmit an omni-directional beam and can transmit at a lower transmit power.

At 590, the serving AP transmits a downlink block ACK steered to Client 2 to acknowledge reception of the uplink transmission at 575 from Client 2. The serving AP coordinates with the DL shield nodes to cause them to send transmissions, at 595, to achieve cover for the serving AP's ACK transmitted to Client 2.

Power Calibration

Taking into account the antenna patterns of the shield nodes and the beamforming that they do to help null the shielding transmissions toward the intended recipients of a data traffic transmission (to have minimum interference at the intended recipient device(s)), the shield nodes will contribute some level of interference at the recipient device(s). Presented here is a scheme to determine how to adjust a power level of the shielding/cover transmissions and/or power level of the data traffic transmissions to minimize interference impact of the shielding transmissions at the intended recipient devices. The procedures of IEEE 802.11ax include the ability of an AP to inform a client as to what power level the client should use to transmit an uplink to the AP. This power calibration process can be run once at the beginning and intermittently throughout service in the shielded space.

The following is a process to estimate how much greater the transmit power can be can be for the streams to/from shield nodes as compared to the power of the shielded data stream. This power difference is computed by an intermittent calibration sequence that determines the Receive Signal Strength Information (RSSI) difference between all shield nodes and the intended clients. These power levels ensure that the data to/from the intended target client has enough margin for decoding to be performed. The data rates used to/from the intended client device can be lowered, if desired, so that the power differential can be increased without leading to increased packet errors.

The calibration procedure involves channel sounding to each shield node on a periodic basis, every N milliseconds, such as 100-5000 milliseconds (ms). This is used for MU-MIMO steering as it would typically be used, as well as to understand current inter-device RSSI levels.

For any given uplink/downlink, the total power used in the stream to/from the intended device is sent at power1 (as a function of data rate) and the power used by all other streams is sent at power_max, such that:

$$\text{power1}(\text{client}, \text{data\_rate}) = \text{RSSI}(\text{shield}) - \text{RSSI}(\text{client}) + \text{decodingMargin\_dB}(\text{data\_rate}) + \text{power\_max} + \text{steering\_gainDb};$$

where,

RSSI(client) is the RSSI associated with reception at the AP of a transmission from that particular client;

RSSI(shield) is the aggregate RSSI at the AP of all the shield nodes that would participate in that transmission event;

decodingMarginDb(data_rate) is the signal-to-noise ratio (SNR) required to decode a packet at the data rate, data_rate;

power_max is the max power to be sent per stream; and steering_gainDb is a typical beamforming/nulling gain achieved by the system.

Figure 6:
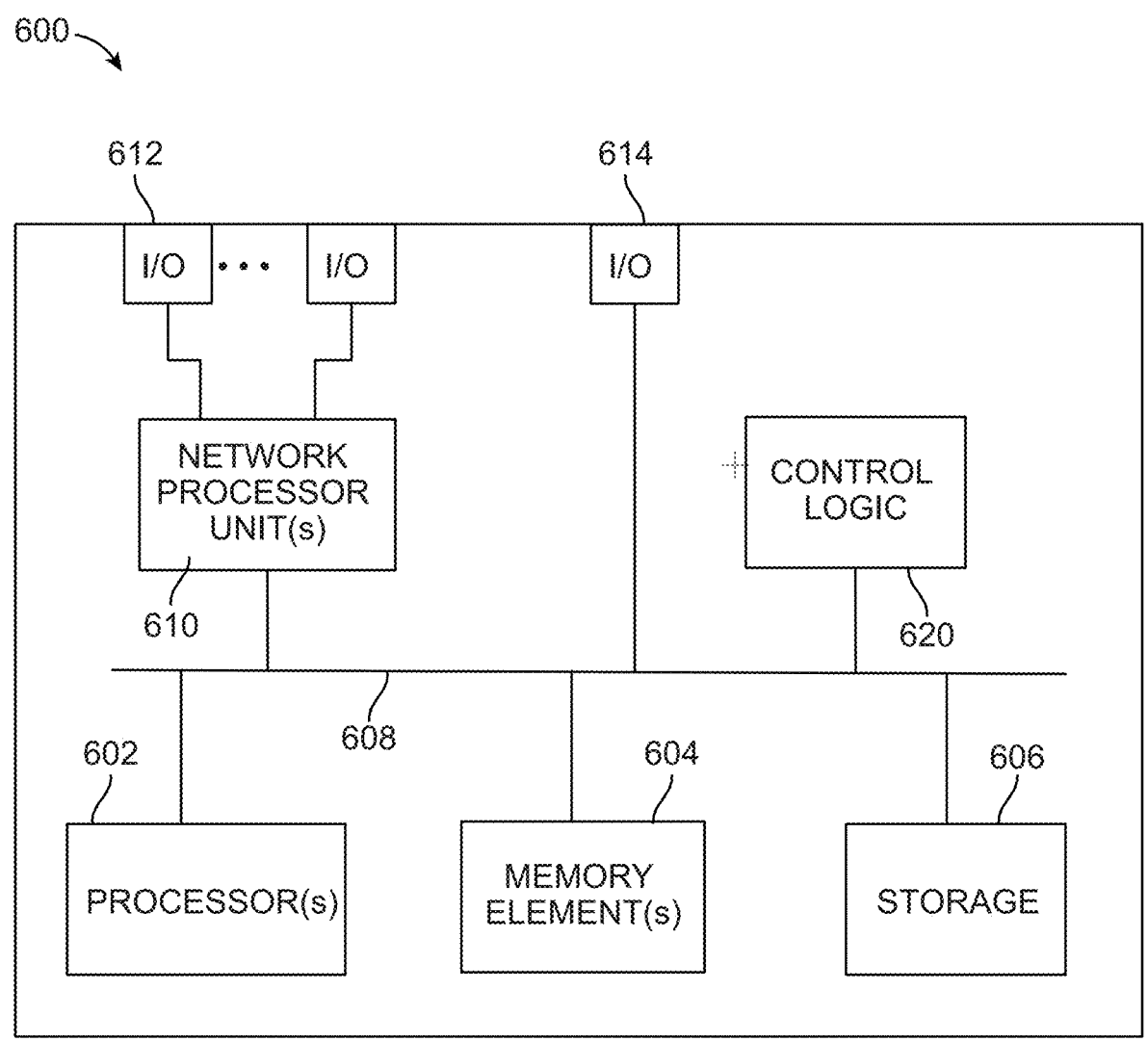
FIG. 6 is a block diagram of a device that may be configured to perform various operations of the techniques presented herein, according to an example embodiment.

Referring to FIG. 6, FIG. 6 illustrates a high-level hardware block diagram of a networking device 600 that may be configured to perform operations of the techniques presented herein, such as operations performed by a wireless access point.

In at least one embodiment, the networking device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for networking device 600 can overlap in any manner and are not limited to the specific allocation of instructions and/or operations described herein.

In at least one embodiment, processor(s) 602 is/are at least one hardware processor configured to execute various tasks, operations and/or functions for networking device 600 as described herein according to software and/or instructions configured for networking device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with networking device 600, and/or logic configured for memory element(s) 604 and/or storage 606. For example, any logic described herein (e.g., control logic 620) can, in various embodiments, be stored for networking device 600 using any combination of memory element(s)604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of networking device 600 to communicate in order to exchange information and/or data. Bus 608 can be implemented with any architecture designed for passing control, data and/or information between processors, memory elements/storage, peripheral devices, and/or any other hardware and/or software components that may be configured for networking device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between networking device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, wireless receivers/transmitters/transceivers, baseband processor(s)/modem(s), and/or other similar network interface driver(s) and/or controller(s) now known or hereafter developed to enable communications between networking device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to networking device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a monitor, a display screen, or the like.

In various embodiments, control logic 620 can include instructions that, when executed, cause processor(s) 602 to perform operations, which can include, but not be limited to, providing overall control operations of host device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a host device for transfer onto another computer readable storage medium.

Figure 7:
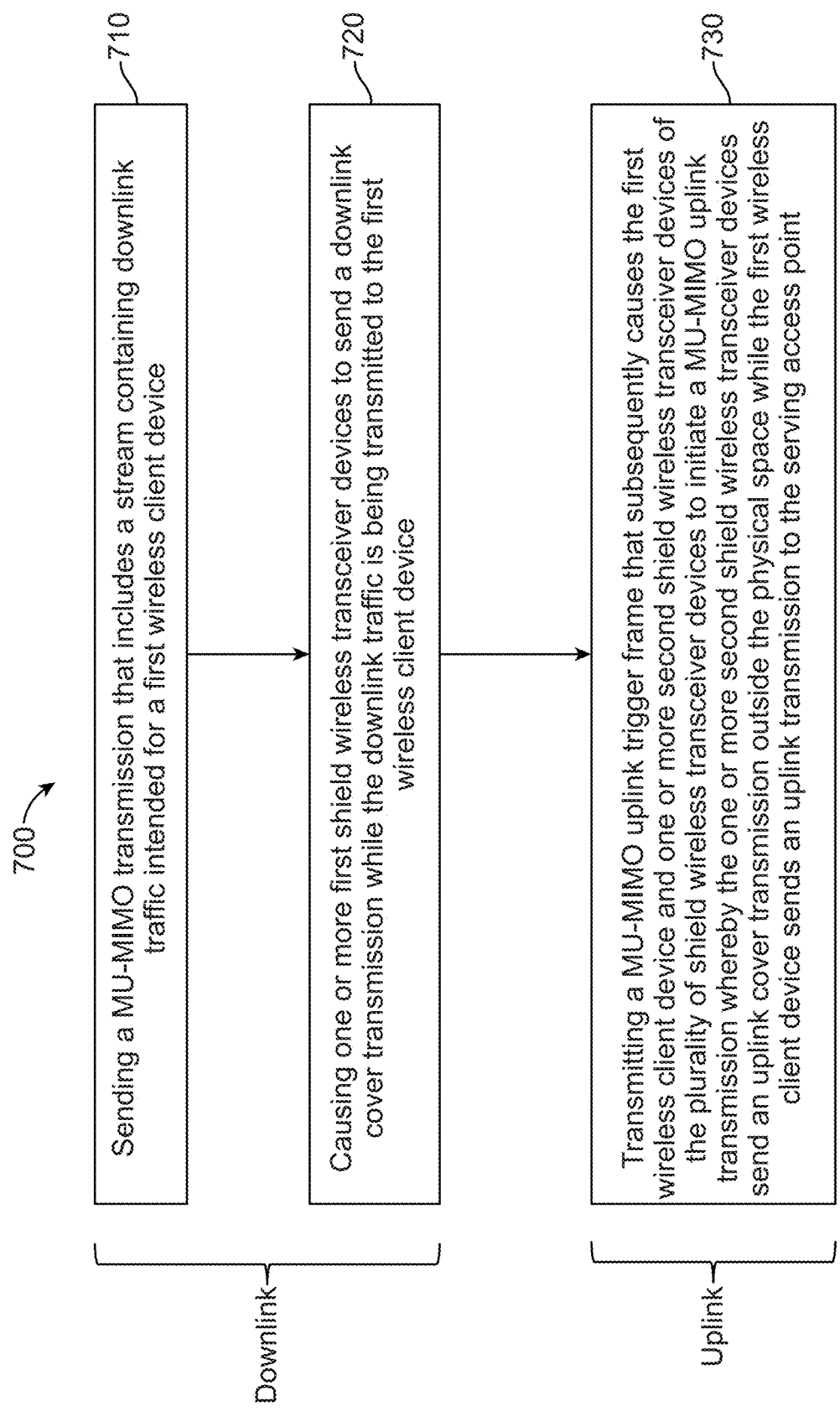
FIG. 7 is a flow chart of a method performed by a serving wireless access point, according to an example embodiment.

Reference is now made to FIG. 7, which illustrates a flow chart for a method 700, according to an example embodiment. Reference is also made to FIGS. 1A and 1B for purposes of the description of FIG. 7. The method 700 may be performed by a serving wireless access point that is capable of wireless communication with one or more wireless client devices within a physical space within which a plurality of shield wireless transceiver devices are positioned around a perimeter of, or in an arrangement within, the physical space. As depicted in FIGS. 1A and 1B, each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices.

For a downlink transmission to be sent from the serving wireless access point to a first wireless client device of the one or more wireless client devices, the method 700 performs operations 710 and 720. At operation 710, the method 700 includes sending a multi-user multiple-input multiple-output (MU-MIMO) transmission that includes a stream containing downlink traffic intended for the first wireless client device. At operation 720, the method 700 includes causing one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device.

For an uplink transmission to be sent from the first wireless client device of the one or more wireless client devices to the serving wireless access point, the method includes, at operation 730, transmitting a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving access point to create interference with reception outside of the physical space of the uplink transmission from the first wireless client device to the serving wireless access point.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, a system provided that includes a master wireless access point device and several shield wireless transceiver devices (nodes). The master wireless access point device sends downlink transmissions to and receives uplink transmissions from both an intended target client device and the shield nodes. MU-MIMO uplink and downlink techniques are used to mask the transmissions (data streams) to the intended target client device and from the target client device to the master wireless access point device.

In some aspects, the techniques described herein relate to a system including: a serving wireless access point configured for wireless communication with one or more wireless client devices within a physical space; and a plurality of shield wireless transceiver devices configured to be positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices; wherein the serving wireless access point is configured, for a downlink transmission to a first wireless client device of the one or more wireless client devices, to: send a multi-user multiple-input multiple-output (MU-MIMO) transmission that includes a stream containing downlink traffic intended for the first wireless client device; and cause one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device; wherein the serving wireless access point is configured, for an uplink transmission from the first wireless client device of the one or more wireless client devices, to: transmit a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

In some aspects, for the downlink transmission, the serving wireless access point is configured to perform beam steering so that the first wireless client device is the only intended recipient device to which the MU-MIMO transmission is steered.

In some aspects, for the downlink transmission, the serving wireless access point is configured to act as a master access point and to coordinate with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

In some aspects, the serving wireless access point is configured to coordinate with the one or more first shield wireless transceiver devices to null the downlink cover transmission to the first wireless client device in order to avoid or minimize interfering with reception by the first wireless client device of the downlink traffic from the serving wireless access point.

In some aspects, for the downlink transmission, the serving wireless access point is configured to send, as part of the MU-MIMO transmission, one or more random data streams to one or more second shield wireless transceiver devices of the plurality of shield wireless transceiver devices.

In some aspects, the serving wireless access point is configured to send the one or more random data streams as part of the MU-MIMO transmission with a higher transmit power level than a power level for the stream that contains the downlink traffic intended for the first wireless client device.

In some aspects, the one or more second shield wireless transceiver devices send the uplink cover transmission with a higher transmit power than a transmit power used by the first wireless client device in sending the uplink transmission to the serving wireless access point.

In some aspects, the serving wireless access point is further configured to perform a calibration procedure to determine a transmit power to be used for transmissions to or from a given wireless client device of the one or more wireless client devices in order to achieve a desired decoding margin at the given wireless client device or at the serving wireless access point.

In some aspects, the serving wireless access point is configured to compute the transmit power as a function of data rate, power(client, data_rate) to be used for transmissions to or from the given wireless client device using a computation: power(client, data_rate)=RSSI(shield)−RSSI(client)+decodingMargin_dB(data_rate)+power_max+ steering_gainDb, where RSSI(client) is received signal strength information associated with reception at the serving wireless access point of a transmission event from the given wireless client device, RSSI(shield) is an aggregate RSSI at the serving wireless access point of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

In some aspects, the techniques described herein relate to a method performed by a serving wireless access point capable of wireless communication with one or more wireless client devices within a physical space within which a plurality of shield wireless transceiver devices are positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices, the method including: for a downlink transmission to be sent from the serving wireless access point to a first wireless client device of the one or more wireless client devices: sending a multi-user multiple-input multiple-output (MU-MIMO) transmission that includes a stream containing downlink traffic intended for the first wireless client device; and causing one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device; for an uplink transmission to be sent from the first wireless client device of the one or more wireless client devices to the serving wireless access point: transmitting a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

In some aspects, the method further includes: performing beam steering so that the first wireless client device is the only intended recipient device to which the MU-MIMO transmission is steered; and coordinating with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

In some aspects, the method further includes: coordinating with the one or more first shield wireless transceiver devices to null the downlink cover transmission to the first wireless client device in order to avoid or minimize interfering with reception by the first wireless client device of the downlink traffic from the serving wireless access point.

In some aspects, for the downlink transmission, the serving wireless access point sends, as part of the MU-MIMO transmission, one or more random data streams to one or more second shield wireless transceiver devices of the plurality of shield wireless transceiver devices.

In some aspects, the method further includes: performing a calibration procedure to determine a transmit power to be used for transmissions to or from a given wireless client device of the one or more wireless client devices in order to achieve a desired decoding margin at the given wireless client device or at the serving wireless access point.

In some aspects, performing the calibration procedure includes: computing the transmit power as a function of data rate, power(client, data_rate) to be used for transmissions to or from the given wireless client device using a computation: power(client, data_rate)=RSSI(shield)−RSSI(client)+decodingMargin_dB(data_rate)+power_max+steering_gainDb, where RSSI(client) is received signal strength information associated with reception at the serving wireless access point of a transmission event from the given wireless client device, RSSI(shield) is an aggregate RSSI at the serving wireless access point of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

In some aspects, the techniques described herein relate to an apparatus including: a plurality of radio transceivers that provide wireless communication with one or more wireless client devices within a physical space, wherein a plurality of shield wireless transceiver devices are positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the apparatus and the one or more wireless client devices; a baseband processor coupled to the plurality of radio transceivers; and a controller coupled to the baseband processor, wherein the controller is configured, for a downlink transmission to a first wireless client device of the one or more wireless client devices, to cause the apparatus to: send a multi-user multiple-input multiple-output (MU-MIMO) transmission that includes a stream containing downlink traffic intended for the first wireless client device; and cause one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device; wherein the controller is configured, for an uplink transmission from the first wireless client device of the one or more wireless client devices, to cause the apparatus to: transmit a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the apparatus to create interference with reception outside of the physical space of the uplink transmission from the first wireless client device to the apparatus.

In some aspects, for the downlink transmission, the controller configures the apparatus to serve as a master access point and to coordinate with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

In some aspects, the controller is configured to cause the apparatus to coordinate with the one or more first shield wireless transceiver devices to null the downlink cover transmission to the first wireless client device in order to avoid or minimize interfering with reception by the first wireless client device of the downlink traffic from the apparatus.

In some aspects, the controller is configured to perform a calibration procedure to determine a transmit power to be used for transmissions to or from a given wireless client device of the one or more wireless client devices in order to achieve a desired decoding margin at the given wireless client device or at the apparatus.

In some aspects, the controller is configured to compute the transmit power as a function of data rate, power(client, data_rate) to be used for transmissions to or from the given wireless client device based on a computation: power(client, data_rate)=RSSI(shield)−RSSI(client)+decodingMargin_dB(data_rate)+power_max+steering_gainDb, where RSSI(client) is received signal strength information associated with reception at apparatus of a transmission event from the given wireless client device, RSSI(shield) is an aggregate RSSI at the apparatus of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

In some aspects, the techniques relate to relate one or more non-transitory computer readable storage media encoded with instructions that, when executed by a processor in a serving wireless access point that includes a plurality of radio transceivers that provide wireless communication with one or more wireless client devices within a physical space, wherein a plurality of shield wireless transceiver devices are positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the apparatus and the one or more wireless client devices; a baseband processor coupled to the plurality of radio transceivers; and a control processor coupled to the baseband processor, wherein the control processor executes the instructions to perform operations including: for a downlink transmission to a first wireless client device of the one or more wireless client devices, cause the serving wireless access point to: send a multi-user multiple-input multiple-output (MU-MIMO) transmission that includes a stream containing downlink traffic intended for the first wireless client device; and cause one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device; for an uplink transmission from the first wireless client device of the one or more wireless client devices, to cause the serving wireless access point to: transmit a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A system comprising:
    a serving wireless access point configured for wireless communication with one or more wireless client devices within a physical space; and
    a plurality of shield wireless transceiver devices configured to be positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices;
    wherein the serving wireless access point is configured, for a downlink transmission to a first wireless client device of the one or more wireless client devices, to:
        send a multi-user multiple-input multiple-output (MU-MIMO) transmission that includes a stream containing downlink traffic intended for the first wireless client device; and
        cause one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device;
    wherein the serving wireless access point is configured, for an uplink transmission from the first wireless client device of the one or more wireless client devices, to:
        transmit a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

2. The system of claim 1, wherein for the downlink transmission, the serving wireless access point is configured to perform beam steering so that the first wireless client device is the only intended recipient device to which the MU-MIMO transmission is steered.

3. The system of claim 2, wherein for the downlink transmission, the serving wireless access point is configured to act as a master access point and to coordinate with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

4. The system of claim 3, wherein the serving wireless access point is configured to coordinate with the one or more first shield wireless transceiver devices to null the downlink cover transmission to the first wireless client device in order to avoid or minimize interfering with reception by the first wireless client device of the downlink traffic from the serving wireless access point.

5. The system of claim 1, wherein for the downlink transmission, the serving wireless access point is configured to send, as part of the MU-MIMO transmission, one or more random data streams to one or more second shield wireless transceiver devices of the plurality of shield wireless transceiver devices.

6. The system of claim 5, wherein the serving wireless access point is configured to send the one or more random data streams as part of the MU-MIMO transmission with a higher transmit power level than a power level for the stream that contains the downlink traffic intended for the first wireless client device.

7. The system of claim 1, wherein the one or more second shield wireless transceiver devices send the uplink cover transmission with a higher transmit power than a transmit power used by the first wireless client device in sending the uplink transmission to the serving wireless access point.

8. The system of claim 1, wherein the serving wireless access point is further configured to perform a calibration procedure to determine a transmit power to be used for transmissions to or from a given wireless client device of the one or more wireless client devices in order to achieve a desired decoding margin at the given wireless client device or at the serving wireless access point.

9. The system of claim 8, wherein the serving wireless access point is configured to compute the transmit power as a function of data rate, power(client, data_rate) to be used for transmissions to or from the given wireless client device using a computation:

$$\text{power(client,data\_rate)}=\text{RSSI(shield)}-\text{RSSI(client)}+\text{decodingMargin\_dB(data\_rate)}+\text{power\_max}+\text{steering\_gainDb},$$

where RSSI(client) is received signal strength information associated with reception at the serving wireless access point of a transmission event from the given wireless client device, RSSI(shield) is an aggregate RSSI at the serving wireless access point of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

10. A method performed by a serving wireless access point capable of wireless communication with one or more wireless client devices within a physical space within which a plurality of shield wireless transceiver devices are positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the serving wireless access point and the one or more wireless client devices, the method including:

for a downlink transmission to be sent from the serving wireless access point to a first wireless client device of the one or more wireless client devices:
sending a multi-user multiple-input multiple-output (MU-MIMO) transmission that includes a stream containing downlink traffic intended for the first wireless client device; and
causing one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device;

for an uplink transmission to be sent from the first wireless client device of the one or more wireless client devices to the serving wireless access point:
transmitting a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the serving wireless access point to create interference with reception outside of the physical space of the uplink transmission from the first wireless client device to the serving wireless access point.

11. The method of claim 10, further comprising:
performing beam steering so that the first wireless client device is the only intended recipient device to which the MU-MIMO transmission is steered; and
coordinating with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

12. The method of claim 11, further comprising:
coordinating with the one or more first shield wireless transceiver devices to null the downlink cover transmission to the first wireless client device in order to avoid or minimize interfering with reception by the first wireless client device of the downlink traffic from the serving wireless access point.

13. The method of claim 10, wherein for the downlink transmission, the serving wireless access point sends, as part of the MU-MIMO transmission, one or more random data streams to one or more second shield wireless transceiver devices of the plurality of shield wireless transceiver devices.

14. The method of claim 10, further comprising:
performing a calibration procedure to determine a transmit power to be used for transmissions to or from a given wireless client device of the one or more wireless client devices in order to achieve a desired decoding margin at the given wireless client device or at the serving wireless access point.

15. The method of claim 14, wherein performing the calibration procedure includes:
computing the transmit power as a function of data rate, power(client, data_rate) to be used for transmissions to or from the given wireless client device using a computation:

$$\text{power}(\text{client},\text{data\_rate}) = \text{RSSI}(\text{shield}) - \text{RSSI}(\text{client}) + \text{decodingMargin\_dB}(\text{data\_rate}) + \text{power\_max} + \text{steering\_gainDb},$$

where RSSI(client) is received signal strength information associated with reception at the serving wireless access point of a transmission event from the given wireless client device, RSSI(shield) is an aggregate RSSI at the serving wireless access point of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

16. An apparatus comprising:
a plurality of radio transceivers that provide wireless communication with one or more wireless client devices within a physical space, wherein a plurality of shield wireless transceiver devices are positioned around a perimeter of, or in an arrangement within, the physical space, wherein each of the shield wireless transceiver devices includes one or more directional antennas pointing outward from the physical space so that transmissions from respective shield wireless transceiver devices are strongest in a predetermined area within the physical space or outside of the physical space where shielding is to be achieved for transmissions between the apparatus and the one or more wireless client devices;
a baseband processor coupled to the plurality of radio transceivers; and
a controller coupled to the baseband processor, wherein the controller is configured, for a downlink transmission to a first wireless client device of the one or more wireless client devices, to cause the apparatus to:
send a multi-user multiple-input multiple-output (MU-MIMO) transmission that includes a stream containing downlink traffic intended for the first wireless client device; and
cause one or more first shield wireless transceiver devices of the plurality of shield wireless transceiver devices to send a downlink cover transmission while the downlink traffic is being transmitted to the first wireless client device that creates interference with reception of the downlink traffic outside of the physical space of the downlink traffic transmitted to the first wireless client device;
wherein the controller is configured, for an uplink transmission from the first wireless client device of the one or more wireless client devices, to cause the apparatus to:

transmit a MU-MIMO uplink trigger frame that subsequently causes the first wireless client device and one or more second shield wireless transceiver devices of the plurality of shield wireless transceiver devices to initiate a MU-MIMO uplink transmission such that the one or more second shield wireless transceiver devices send an uplink cover transmission outside the physical space while the first wireless client device sends an uplink transmission to the apparatus to create interference with reception outside of the physical space of the uplink transmission from the first wireless client device to the apparatus.

17. The apparatus of claim 16, wherein for the downlink transmission, the controller configures the apparatus to serve as a master access point and to coordinate with the one or more first shield wireless transceiver devices to act as slave access points and to cause the one or more first shield wireless transceiver devices to transmit the downlink cover transmission that carries random or bogus data directed towards non-existent clients outside the physical space via the directional antennas of the one or more first shield wireless transceiver devices.

18. The apparatus of claim 17, wherein the controller is configured to cause the apparatus to coordinate with the one or more first shield wireless transceiver devices to null the downlink cover transmission to the first wireless client device in order to avoid or minimize interfering with reception by the first wireless client device of the downlink traffic from apparatus.

19. The apparatus of claim 16, wherein the controller is configured to perform a calibration procedure to determine a transmit power to be used for transmissions to or from a given wireless client device of the one or more wireless client devices in order to achieve a desired decoding margin at the given wireless client device or at the apparatus.

20. The apparatus of claim 19, wherein the controller is configured to compute the transmit power as a function of data rate, power(client, data_rate) to be used for transmissions to or from the given wireless client device based on a computation:

$$\text{power(client,data\_rate)} = \text{RSSI(shield)} - \text{RSSI(client)} + \text{decodingMargin\_dB(data\_rate)} + \text{power\_max} + \text{steering\_gainDb},$$

where RSSI(client) is received signal strength information associated with reception at apparatus of a transmission event from the given wireless client device, RSSI(shield) is an aggregate RSSI at the apparatus of all shield wireless transceiver devices that would participate in the transmission event, decodingMarginDb(data_rate) is a signal-to-noise ratio (SNR) to decode a packet at the data rate, power_max is a maximum power to be sent per stream, and steering_gainDb is a beamforming/nulling gain.

* * * * *